UNITED STATES PATENT OFFICE.

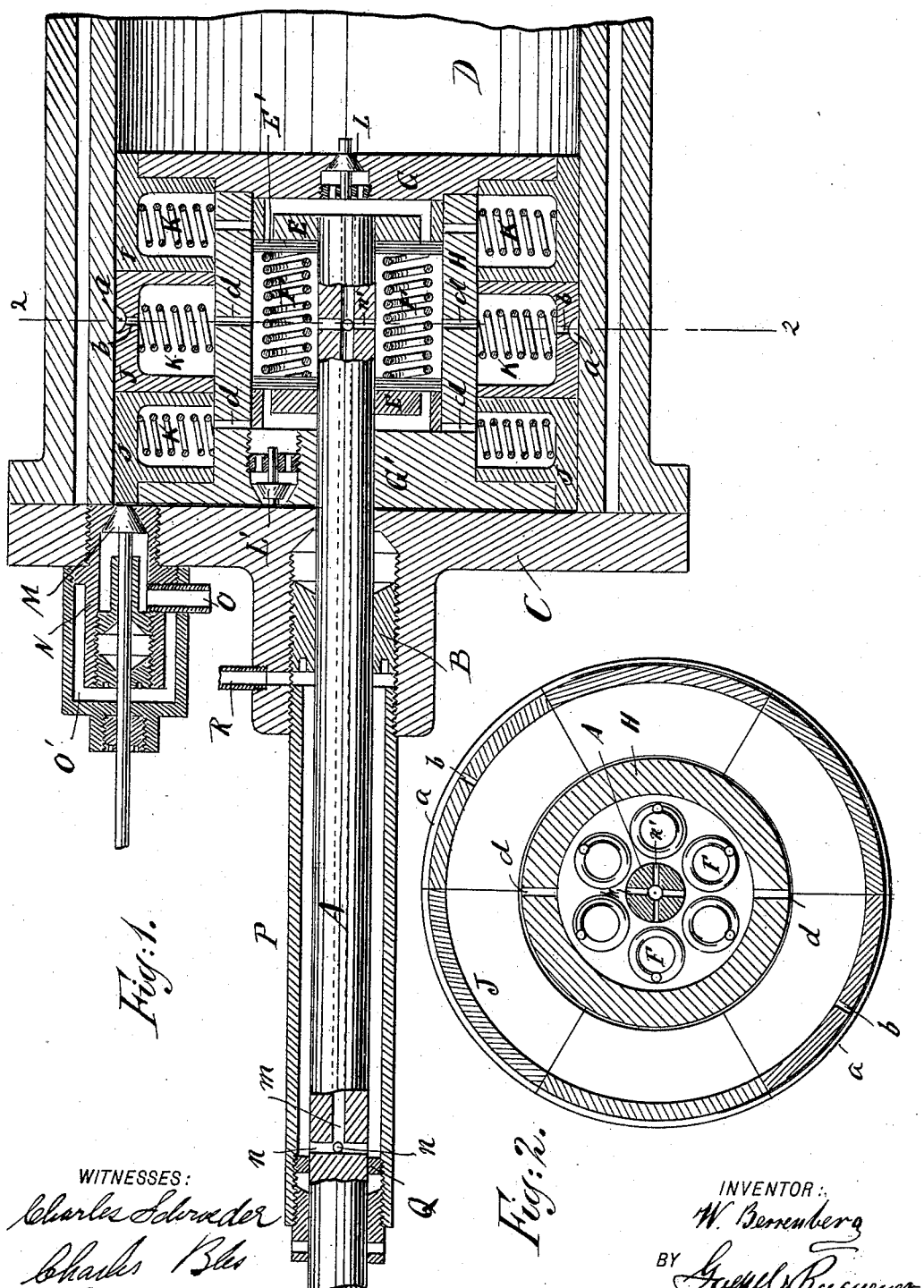
(No Model.)
W. BERRENBERG.
LUBRICATING PISTON.
No. 474,075.　　　Patented May 3, 1892.

WILLIAM BERRENBERG, OF BOSTON, MASSACHUSETTS, ASSIGNOR OF ONE-HALF TO ALBERT L. REINMANN, OF NEW YORK, N. Y.

LUBRICATING-PISTON.

SPECIFICATION forming part of Letters Patent No. 474,075, dated May 3, 1892.

Application filed August 25, 1891. Serial No. 403,697. (No model.)

*To all whom it may concern:*

Be it known that I, WILLIAM BERRENBERG, a citizen of the United States, residing at Boston, in the county of Suffolk, in the State of Massachusetts, have invented certain new and useful Improvements in Vacuum-Pumps, of which the following is a specification.

This invention relates to improvements in vacuum-pumps, and especially to the piston for the same.

The object of my invention is to provide a piston for a vacuum-pump, which is so constructed that it does not jar the machinery, forms an absolutely close joint, and is very effective in use.

The invention consists in a hollow piston provided in each head with an inwardly-opening outlet-valve and means for conducting a liquid into said hollow piston.

The invention further consists in the combination, with a piston-rod, of a piston and intermediary springs for transmitting motion from said piston-rod to the piston.

The invention also consists in the construction and combination of parts and details, which will be fully described hereinafter, and finally pointed out in the claims.

In the accompanying drawings, Figure 1 is a vertical longitudinal sectional view of the end part of a pump-cylinder containing my improved piston. Fig. 2 is a vertical transverse sectional view of the cylinder on the line 2 2, Fig. 1, parts being omitted.

The piston-rod A passes through a suitable stuffing-box B in the head C of a cylinder D. Said piston-rod is provided with two fixed rings or collars E E a short distance from each other, and against the same the washers E' E' rest. Between said washers six (more or less) powerful helical springs F are arranged around the piston-rod, the ends of said springs bearing and resting against the washers E'. The piston is constructed with the two heads G G', connected by the cylindrical section H, the diameter of which is about half the diameter of the piston. Said cylindrical section H rests against and surrounds the washers E'. Between the heads G and G' and around the cylindrical section H three circular rows of U-shaped piston-rings J are arranged that are pressed outward by helical springs K, located within said piston-rings and resting on the cylindrical section H. Said springs K, which are made very powerful, press the piston-rings J outward and against the inner surface of the cylinder.

In the outer surface of the piston-ring J of the middle series a groove $a$ is formed, and from the same an aperture $b$ leads to the interior of the piston. At the inner part of each piston-ring J an aperture or apertures $d$ are formed in the cylindrical section H, for a reason that will appear hereinafter.

The piston-head G contains the inwardly-opening valve L and the head G' contains the inwardly-opening valve L', the ports of both of said valves communicating with the interior of the piston.

An escape-valve M is arranged in a suitable casing in the head C of the cylinder, and its port N is connected with a pipe O. The stem of the valve M is passed through suitable stuffing-boxes, the inner one of which is surrounded by an oil-chamber O'.

The piston-rod A is provided with a longitudinal bore $m$ and at the ends of said longitudinal bore with the transverse bores $n$ and $n'$. The piston-rod is surrounded by a jacket P, forming an oil-space around said piston-rod, one end of the jacket being formed by the stuffing-box B and the other end by a packing or stuffing box Q, held in the end of the jacket P. A pipe R serves for conducting oil into the space formed by the jacket P. The oil conducted through the pipe R into the space formed by said jacket P is under very great pressure, and said oil passes through the bores $n$ into the longitudinal bore $m$ of the piston-rod, and through the bores $n'$ at the other end of the piston-rod into the piston, in which it remains under pressure. Some of this oil under pressure is forced through the apertures $d$ and $b$ into the groove $a$, thus serving to lubricate the piston and also to cause the same to form an absolutely air-tight joint. Whenever the piston completes its stroke, the stem of one of the valves L or L' projects against the inner surface of one of the heads of the cylinder, whereby the valve is opened and a quantity of the oil under pressure in the piston is forced out through said opening and into the space between the inner surfaces of the heads and the ends of the piston. This oil serves for forcing out all the air still remaining between the piston and cylinder-head. This oil remains in the cylinder until the piston makes its return stroke, when said oil is forced out through the valve M. The stuffing-box is kept absolutely tight, as the same is subjected to the pressure of the oil under pressure in the space formed by the jacket P. As a quantity of oil under pressure is discharged from the piston at the end of each stroke, all the air is forced out of the cylinder by this oil in connection with the piston, and thus an absolute vacuum is obtained for each stroke of the piston. The piston-rod is not connected directly with the piston, but the power is transmitted from the piston-rod to the piston by the intermediary cushioning-springs F, whereby all jarring and undue straining is avoided, and, furthermore, the parts can be so adjusted that the piston comes directly against the cylinder-head without breaking parts of the machinery, as the cushioning-springs deaden the blow.

Having thus described my invention, I claim as new and desire to secure by Letters Patent—

1. The combination, with a cylinder, of a hollow piston-rod, a piston formed of two heads, a cylindrical section connecting said heads and provided with apertures, U-shaped piston-rings surrounding said circular sections, and springs in said piston-rings for pressing them outward, which springs rest on the cylindrical section, substantially as set forth.

2. The combination, with a cylinder, of a hollow piston in the same, an inwardly-opening outlet-valve in each head of the piston, means for conducting a liquid into the hollow piston, and an outlet-valve in the head of the cylinder, substantially as set forth.

3. The combination, with a cylinder, of a hollow piston in the same, a piston-rod connected with said piston and provided with a longitudinal bore and with two transverse bores, one within the piston and the other outside of the same, a jacket surrounding the piston-rod, stuffing-boxes at the ends of said jacket, through which stuffing-boxes the piston-rod passes, and a pipe for conducting a liquid into the jacketed space, substantially as set forth.

4. The combination, with a cylinder, of a hollow piston in the same, an inwardly-opening outlet-valve in each head of the piston, means for conducting a liquid into the hollow piston, an outlet-valve in the head of the cylinder, a casing containing said valve, and a tube for carrying off the oil from said casing, substantially as set forth.

In testimony that I claim the foregoing as my invention I have signed my name in presence of two subscribing witnesses.

WILLIAM BERRENBERG.

Witnesses:
ADOLPH LOUBIN,
HENRY HUBER.